United States Patent
Kumar et al.

(10) Patent No.: US 12,524,736 B2
(45) Date of Patent: Jan. 13, 2026

(54) TEMPORAL SUPPLY-RELATED FORECASTING USING ARTIFICIAL INTELLIGENCE TECHNIQUES

(71) Applicant: Dell Products L.P., Round Rock, TX (US)

(72) Inventors: Dhilip S. Kumar, Bangalore (IN); Sujit Kumar Sahoo, Bangalore (IN); Devaraj Marappa, Hosur (IN); Nikhil Pularru, New Delhi (IN); Aravinda Rajagopal Kotikanyadanam, Bangalore (IN); Rajeshwari Kalyani, Ranchi (IN)

(73) Assignee: Dell Products L.P., Round Rock, TX (US)

( * ) Notice: Subject to any disclaimer, the term of this patent is extended or adjusted under 35 U.S.C. 154(b) by 286 days.

(21) Appl. No.: 18/078,363

(22) Filed: Dec. 9, 2022

(65) Prior Publication Data
US 2024/0193538 A1 Jun. 13, 2024

(51) Int. Cl.
*G06Q 10/087* (2023.01)
*G06Q 30/0202* (2023.01)

(52) U.S. Cl.
CPC ....... *G06Q 10/087* (2013.01); *G06Q 30/0202* (2013.01)

(58) Field of Classification Search
CPC .............. G06Q 10/087; G06Q 30/0202
See application file for complete search history.

(56) References Cited

U.S. PATENT DOCUMENTS

| | | | |
|---|---|---|---|
| 7,251,589 B1 * | 7/2007 | Crowe | G06F 17/18 702/181 |
| 10,748,072 B1 * | 8/2020 | Seeger | G06N 20/00 |
| 10,783,442 B1 * | 9/2020 | Torkkola | G06N 3/044 |

(Continued)

FOREIGN PATENT DOCUMENTS

| IN | 202211073137 A | * 12/2022 |
|---|---|---|
| JP | 6211759 B2 | 10/2017 |

OTHER PUBLICATIONS

Shaikh, A. K., Nazir, A., Khan, I., & Shah, A. S. (2022). Short term energy consumption forecasting using neural basis expansion analysis for interpretable time series. Scientific Reports (Nature Publisher Group), 12(1), 22562. doi:https://doi.org/10.1038/s41598-022-26499-y (Year: 2022).*

Oreshkin, Boris N et al. "N-BEATS: Neural Basis Expansion Analysis for Interpretable Time Series Forecasting." arXiv.org (2020): n.pag. Print (Year: 2020).*

(Continued)

*Primary Examiner* — Ashford S Hayles
(74) *Attorney, Agent, or Firm* — Ryan, Mason & Lewis, LLP

(57) ABSTRACT

Methods, apparatus, and processor-readable storage media for temporal supply-related forecasting using artificial intelligence techniques are provided herein. An example computer-implemented method includes determining one or more forecasts pertaining to supply of at least one item by processing supply-related data using one or more artificial intelligence techniques; generating, based at least in part on the one or more forecasts, one or more temporal recommendations associated with one or more orders of at least one a portion of the at least one item; and performing one or more automated actions based at least in part on the one or more temporal recommendations.

20 Claims, 6 Drawing Sheets

(56) References Cited

U.S. PATENT DOCUMENTS

| | | | | |
|---|---|---|---|---|
| 11,120,361 | B1* | 9/2021 | Januschowski | G06N 20/00 |
| 11,281,969 | B1* | 3/2022 | Rangapuram | G06N 3/0442 |
| 11,544,724 | B1* | 1/2023 | Wick | G06Q 30/0202 |
| 11,989,657 | B2* | 5/2024 | Chavoshi | G06N 3/0499 |
| 2003/0225635 | A1* | 12/2003 | Renz | G06Q 10/087 |
| | | | | 705/28 |
| 2016/0217406 | A1* | 7/2016 | Najmi | G06Q 10/06315 |
| 2016/0260052 | A1* | 9/2016 | Ray | G06Q 10/087 |
| 2020/0111174 | A1* | 4/2020 | Wang | G06N 7/01 |
| 2020/0143313 | A1* | 5/2020 | Ohlsson | G06N 3/09 |
| 2021/0344695 | A1* | 11/2021 | Palani | G06F 16/285 |
| 2021/0390498 | A1* | 12/2021 | Ohlsson | G06N 20/00 |
| 2022/0180274 | A1* | 6/2022 | Makhija | G06F 16/285 |
| 2022/0300860 | A1* | 9/2022 | Guo | G06Q 30/0201 |
| 2023/0101023 | A1* | 3/2023 | Jin | G06Q 10/087 |
| | | | | 705/7.31 |
| 2023/0244947 | A1* | 8/2023 | Woo | G06N 3/045 |
| | | | | 706/21 |
| 2023/0376746 | A1* | 11/2023 | Woo | G06N 3/048 |
| 2024/0020545 | A1* | 1/2024 | Silverman | G06N 20/00 |
| 2024/0095577 | A1* | 3/2024 | Mukherjee | G06N 20/00 |
| 2025/0265546 | A1* | 8/2025 | Ohlsson | G06N 3/09 |

OTHER PUBLICATIONS

Shaikh, A. K., Nazir, A., Khan, I., & Shah, A. S. (2022). Short term energy consumption forecasting using neural basis expansion analysis for interpretable time series. Scientific Reports (Nature Publisher Group), 12(1), 22562. doi:https://doi.org/10.1038/s41598-022-26499-y (Year: 2022).*

J.-F. Toubeau, J. Bottieau, F. Vallee and Z. De Greve, "Deep Learning-Based Multivariate Probabilistic Forecasting for Short-Term Scheduling in Power Markets," in IEEE Transactions on Power Systems, vol. 34, No. 2, pp. 1203-1215, Mar. 2019 (Year: 2019).*

Lim, Bryan, and Stefan Zohren. "Time-series forecasting with deep learning: a survey." Philosophical Transactions of the Royal Society A 379.2194 (2021): 20200209. (Year: 2021).*

K. Agarwal, L. Dheekollu, G. Dhama, A. Arora, S. Asthana and T. Bhowmik, "Deep Learning based Time Series Forecasting," 2020 19th IEEE International Conference on Machine Learning and Applications (ICMLA), Miami, FL, USA, 2020, pp. 859-864, doi: 10.1109/ICMLA51294.2020.00140 (Year: 2020).*

Oreshkin et al., N-BEATS: Neural basis expansion analysis for interpretable time series forecasting, Feb. 2020.

* cited by examiner

FIG. 5

```
df0 = pd.read_csv("Inventory_data.csv", header=0, parse_dates=["Snapshot_date_time"])
df0.iloc [[0, -1]]
```
500

FIG. 6

```
# create time series object for target variable
ts_P = TimeSeries.from_series(df4["price"])

# check attributes of the time series
print("components:", ts_P.components)
print("duration:", ts_P.duration)
print("frequency:", ts_P.freq)
print("frequency:", ts_P.freq_str)
print("has date time index? (or else, it must have an integer index):", ts_P.has_datetime_index)
print("deterministic:", ts_P.is_deterministic)
print("univariate:", ts_P.is_univariate)
```
600

FIG. 7

```
model = NBEATSModel(  input_chunk_length=INLEN,
                      output_chunk_length=N_FC,
                      num_stacks=BLOCKS,
                      layer_widths=LWIDTH,
                      batch_size=BATCH,
                      n_epochs=EPOCHS,
                      nr_epochs_val_period=VALWAIT,
                      likelihood=QuantileRegression(QUANTILES),
                      optimizer_kwargs={"lr": LEARN},
                      model_name="Anamoly Supply Prediction",
                      log_tensorboard=True,
                      generic_architecture=True,
                      random_state=RAND,
                      force_reset=True,
                      save_checkpoints=True
                   )
```

FIG. 8

800 — DETERMINE ONE OR MORE FORECASTS PERTAINING TO SUPPLY OF AT LEAST ONE ITEM BY PROCESSING SUPPLY-RELATED DATA USING ONE OR MORE ARTIFICIAL INTELLIGENCE TECHNIQUES

802 — GENERATE, BASED AT LEAST IN PART ON THE ONE OR MORE FORECASTS, ONE OR MORE TEMPORAL RECOMMENDATIONS ASSOCIATED WITH ONE OR MORE ORDERS OF AT LEAST ONE A PORTION OF THE AT LEAST ONE ITEM

804 — PERFORM ONE OR MORE AUTOMATED ACTIONS BASED AT LEAST IN PART ON THE ONE OR MORE TEMPORAL RECOMMENDATIONS

TEMPORAL SUPPLY-RELATED FORECASTING USING ARTIFICIAL INTELLIGENCE TECHNIQUES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to techniques for processing data using such systems.

BACKGROUND

A challenge facing enterprises providing products includes consistency in delivery commitments. Many conventional supply management approaches include keeping inventories to a minimum, which can create delays between order dates and delivery dates during periods of demand fluctuation and/or supply visibility anomalies. Additionally, some of these conventional supply management approaches provide delivery dates which include fixed lead times encompassing additional time beyond estimated commitments. Such approaches, however, can create unnecessary delays and/or inconsistencies in delivery dates, potentially resulting in resource wastage and/or negative impacts on user experience.

SUMMARY

Illustrative embodiments of the disclosure provide techniques for temporal supply-related forecasting using artificial intelligence techniques.

An exemplary computer-implemented method includes determining one or more forecasts pertaining to supply of at least one item by processing supply-related data using one or more artificial intelligence techniques. Additionally, the method includes generating, based at least in part on the one or more forecasts, one or more temporal recommendations associated with one or more orders of at least one a portion of the at least one item. Further, the method includes performing one or more automated actions based at least in part on the one or more temporal recommendations.

Illustrative embodiments can provide significant advantages relative to conventional supply management approaches. For example, problems associated with unnecessary delays and/or inconsistencies in delivery dates are overcome in one or more embodiments through generating and implementing temporal supply-related forecasts using artificial intelligence techniques.

These and other illustrative embodiments described herein include, without limitation, methods, apparatus, systems, and computer program products comprising processor-readable storage media.

BRIEF DESCRIPTION OF THE DRAWINGS

FIG. 5 shows example pseudocode for preparing a supply data frame in an illustrative embodiment.

FIG. 6 shows example pseudocode for creating a time series object for a target variable and checking attributes thereof in an illustrative embodiment.

FIG. 7 shows example pseudocode for configuring a neural basis expansion analysis for interpretable time series forecasting (N-BEATS) model in an illustrative embodiment.

FIG. 8 is a flow diagram of a process for temporal supply-related forecasting using artificial intelligence techniques in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
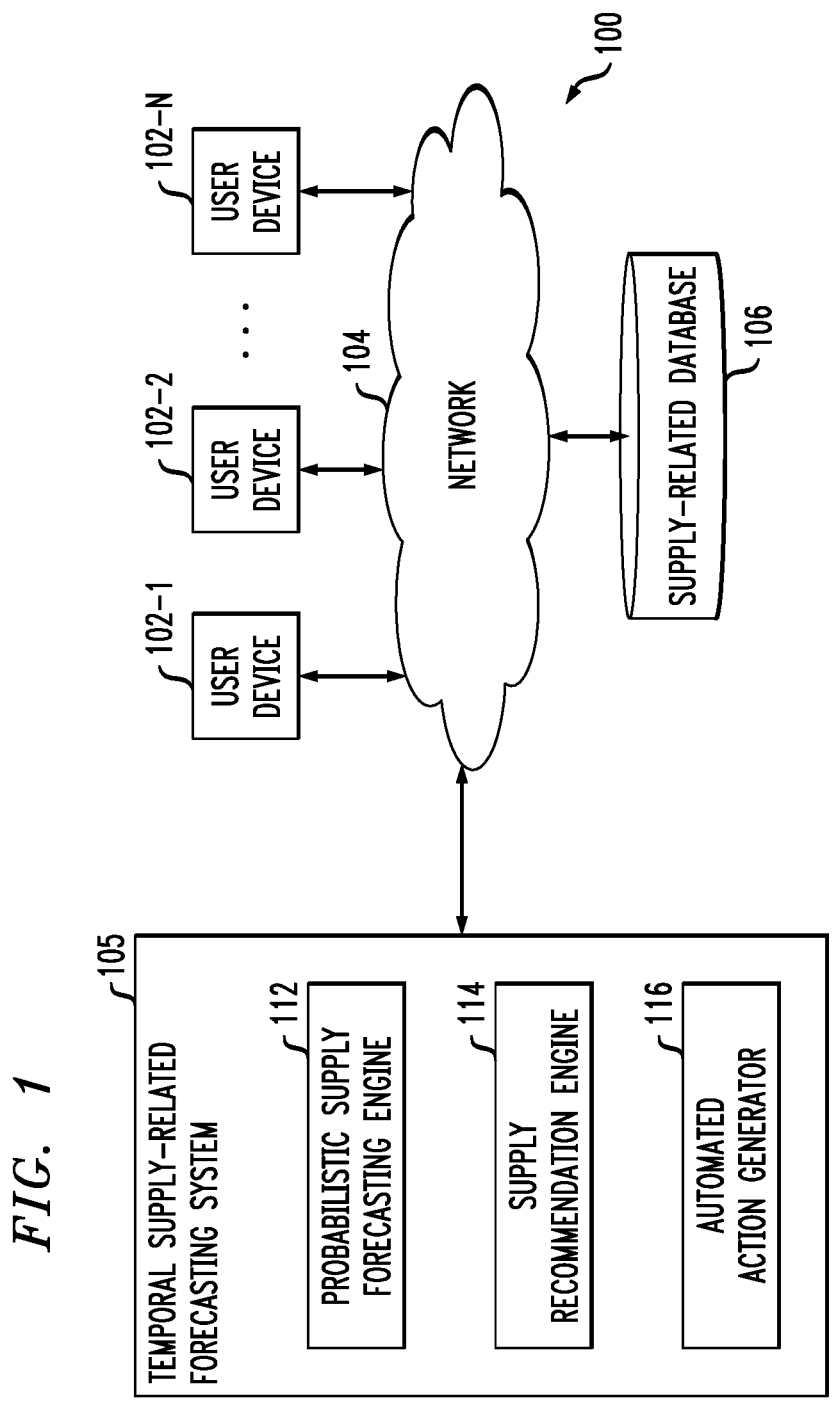
FIG. 1 shows an information processing system configured for temporal supply-related forecasting using artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-N, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is temporal supply-related forecasting system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, temporal supply-related forecasting system 105 can have an associated supply-related database 106 configured to store data pertaining to physical supply information, digital supply information, forecasted supply information, etc.

The supply-related database 106 in the present embodiment is implemented using one or more storage systems associated with temporal supply-related forecasting system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with temporal supply-related forecasting system 105 are one or more input-output devices, which illustratively comprise keyboards, displays or other types of input-output devices in any combination. Such input-output devices can be used, for example, to support one or more user interfaces to temporal supply-related forecasting system 105, as well as to support communication between temporal supply-related forecasting system 105 and other related systems and devices not explicitly shown.

Additionally, temporal supply-related forecasting system 105 in the FIG. 1 embodiment is assumed to be implemented using at least one processing device. Each such processing device generally comprises at least one processor and an associated memory, and implements one or more functional modules for controlling certain features of temporal supply-related forecasting system 105.

More particularly, temporal supply-related forecasting system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows temporal supply-related forecasting system 105 to communicate over the network 104 with the user devices 102, and illustratively comprises one or more conventional transceivers.

The temporal supply-related forecasting system 105 further comprises a probabilistic supply forecasting engine 112, a supply recommendation engine 114, and an automated action generator 116.

It is to be appreciated that this particular arrangement of elements 112, 114 and 116 illustrated in the temporal supply-related forecasting system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for temporal supply-related forecasting using artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, temporal supply-related forecasting system 105 and supply-related database 106 can be on and/or part of the same processing platform.

An exemplary process utilizing elements 112, 114 and 116 of an example temporal supply-related forecasting system 105 in computer network 100 will be described in more detail with reference to the flow diagram of FIG. 8.

Accordingly, at least one embodiment includes temporal supply-related forecasting using artificial intelligence techniques. Such an embodiment includes improving upon fixed conservative lead times of conventional approaches by using probabilistic time series supply forecasting techniques that learn from historical actual supply rate information.

As further detailed herein, one or more embodiments includes performing a probabilistic analysis to recommend the future supply of one or more items (e.g., one or more products or components thereof) to maintain consistency in commitment times. Such an embodiment includes learning uninterrupted supply information periodically and understanding and/or determining supply ratios in various time frames. For example, supply information such as, e.g., available inventory and projected inventory in various categories, can include a continuous data feed, and such an embodiment includes learning, from each such feed, a ratio of the supply in various time periods. As such, in accordance with such an example, one or more embodiments can include learning and/or understanding available inventory versus projected inventory, wherein such information can be used in scenarios such as, for example, data feed interruptions.

Based at least in part on such learning and/or determinations, such an embodiment includes predicting one or more future supply outcomes by applying one or more probabilistic forecasting techniques. In at least one embodiment, continuous learning techniques are carried out to assign a probability to multiple future supply outcomes (e.g., every possible outcome).

Figure 2:
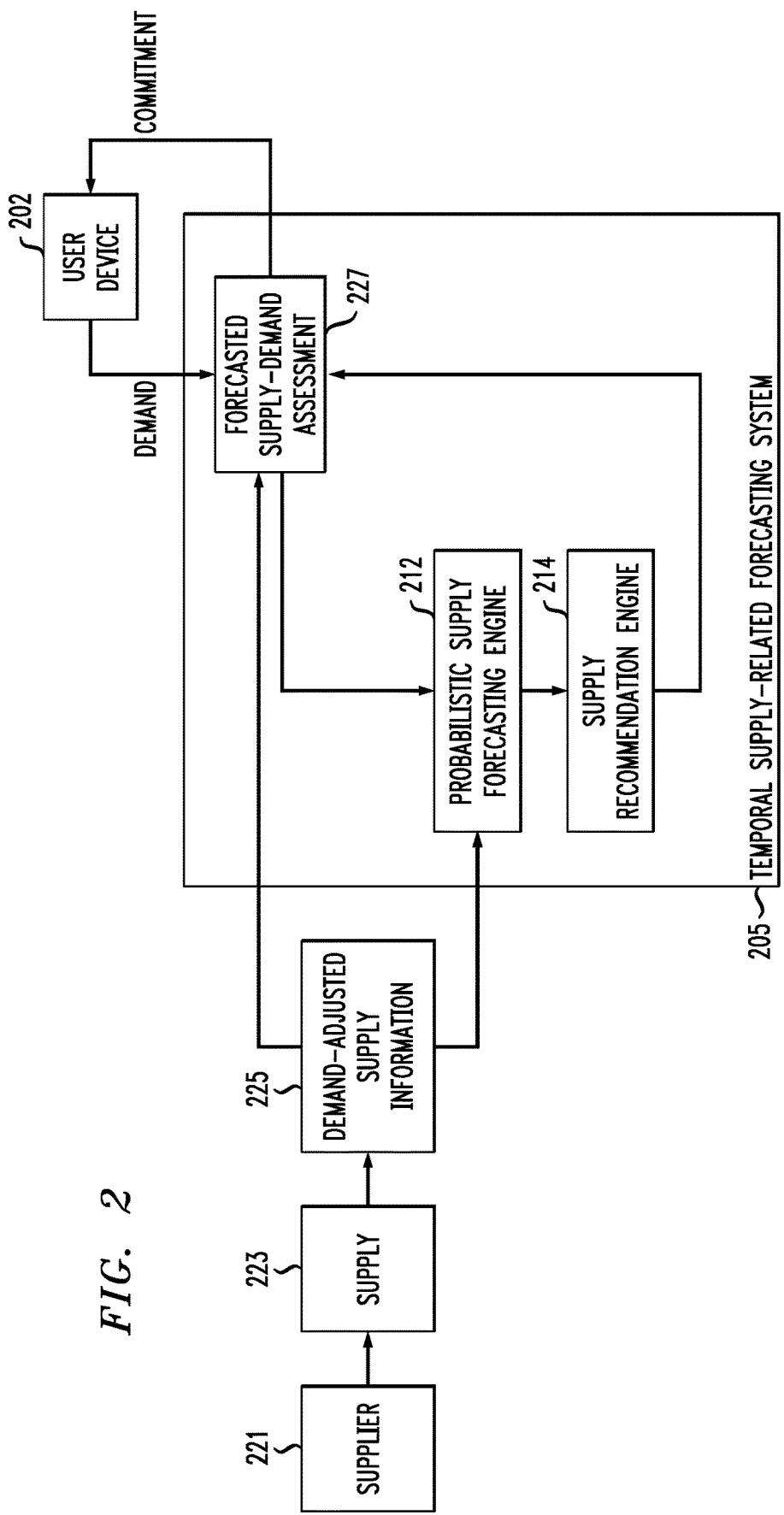
FIG. 2 shows an example workflow in an illustrative embodiment.

FIG. 2 shows an example workflow in an illustrative embodiment. By way of illustration, FIG. 2 depicts a supplier 221 providing actual supply 223 (e.g., of one or more goods and/or products), which is used to generate demand-adjusted supply information 225. For example, in one or more embodiments, supply information is adjusted (resulting in demand-adjusted supply information 225) against the demand that is already committed but not fulfilled (e.g., orders versus inventory). Demand-adjusted supply information 225 is provided as input to probabilistic supply forecasting engine 212 (within temporal supply-related forecasting system 205), and also provided as input to forecasted supply-demand assessment 227. In at least one embodiment forecasted supply-demand assessment 227 includes a representation (for example, a graphical representation) of demand information and supply information associated with a customer (e.g., associated with user device 202) commitment.

As also depicted in FIG. 2, user device 202 (e.g., a desktop, mobile device, etc. of a customer) provides actual demand data (e.g., as related to one or more orders submitted by the customer via user device 202) to temporal supply-related forecasting system 205. Accordingly, probabilistic supply forecasting engine 212, based at least in part on the above-noted inputs (e.g., in one or more embodiments, netting of demand information and supply information is carried out before related inputs are provided to probabilistic supply forecasting engine 212), generates at least one supply forecast and supplies the same to supply recommendation engine 214. The recommendation(s) generated by supply recommendation engine 214 is/are provided as input to forecasted supply-demand assessment 227, which serves as a basis for providing a temporal commitment to user device 202 (e.g., a delivery commitment to the customer in response to the customer's order(s)).

Accordingly, in at least one embodiment, a probabilistic supply forecasting engine forecasts future values based at least in part on previously observed values and one or more extrapolation techniques. Such an embodiment also includes a supply recommendation engine, which processes the forecasts from the probabilistic supply forecasting engine and constructs and/or determines a final supply view. In one or more embodiments, at least one custom rule can be used to measure at least a portion of the forecasts in connection with one or more threshold values (e.g., such a threshold value is used to validate an abnormality).

By way merely of example, consider a scenario wherein supply (from a supplier) of one or more items is to be received every hour for the next given number of days (e.g., 10 days). Additionally, such a supply changes every hour due to inventory receipt and consumption. Also, assume, for example, that the supply data for 1:00 PM, 2:00 PM, and 3:00 PM on at least one day is missing due to an anomaly, and as such, one or more supply values should be predicted. One or more embodiments include generating such predictions using probabilistic forecasts, which includes assigning a probability to each possible outcome rather than producing a single value as a single outcome (e.g., the best outcome).

Figure 3:
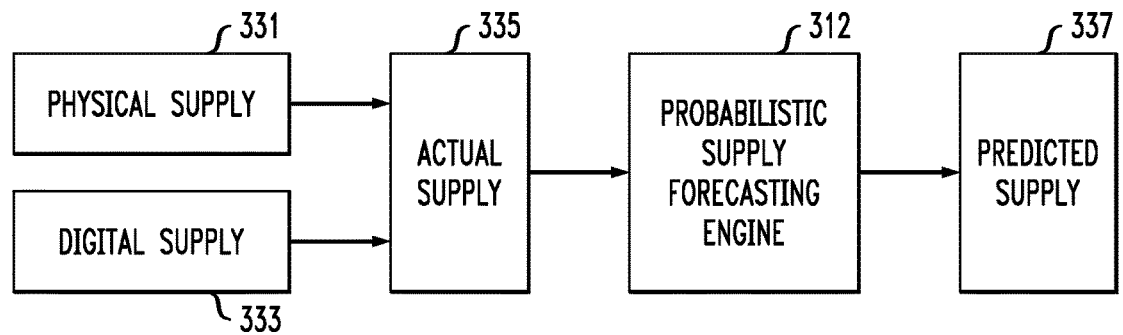
FIG. 3 shows an example workflow in an illustrative embodiment.

FIG. 3 shows an example workflow in an illustrative embodiment. By way of illustration, FIG. 3 depicts physical supply of one or more items 331 and digital supply of one or more items 333 being combined to compile an actual supply 335. Information pertaining to the actual supply 335 is processed by probabilistic supply forecasting engine 312 to generate a predicted supply 337.

In connection with one or more embodiments, such as depicted in the FIG. 3 example, supply values can be forecasted at each of multiple points in time within a given (adjustable) time horizon (e.g., a 12-hour horizon). Subsequently, in at least one embodiments, in the event that actual supply data is unavailable (e.g., due to an anomaly), predicted supply can be taken into consideration for commitment information.

At least one embodiment includes using N-BEATS, a probabilistic forecasting approach (further detailed in connection with FIG. 7). For example, an N-BEATS forecasting approach includes a univariate time series prediction architecture comprising a deep neural network structure based at least in part on forward and backward residual connections and a deep fully connected layer stack.

N-BEATS can be cast as an instance of meta-learning by, for example, drawing the following parallels. In one or more embodiments, the outer learning procedure is encapsulated in the parameters of the entire network, learned by gradient descent. The inner learning procedure is encapsulated in a set of building blocks and modifies the expansion coefficients $\theta^f$ that basis $g^f$ takes as inputs. The inner learning procedure proceeds through a sequence of stages, each corresponding to a block within the stack of the architecture. Each of the blocks can be thought of as performing the equivalent of an update step which gradually modifies the expansion coefficients $\theta^f$, which eventually feed into $g^f$ in each block (which get added together to form the final prediction). In one or more embodiments, the inner learning procedure takes a single history from at least a portion of time series data and uses that history as a training dataset. The inner learning procedure also produces forward expansion coefficients $\theta^f$, which parametrically map inputs to predictions.

In addition, each preceding block modifies the input to the next block by producing backward expansion coefficients $\theta^b$, thus conditioning the learning and the output of the next block. In the case of an interpretable model, the meta-parameters are only in the fully connected layers because the $g^f$'s are fixed. In the case of a generic model, the meta-parameters can be used, at least in part, in defining the $g^f$ non-parametrically. This can increase the number of blocks in the stack, as well as the number of stacks.

Figure 4:
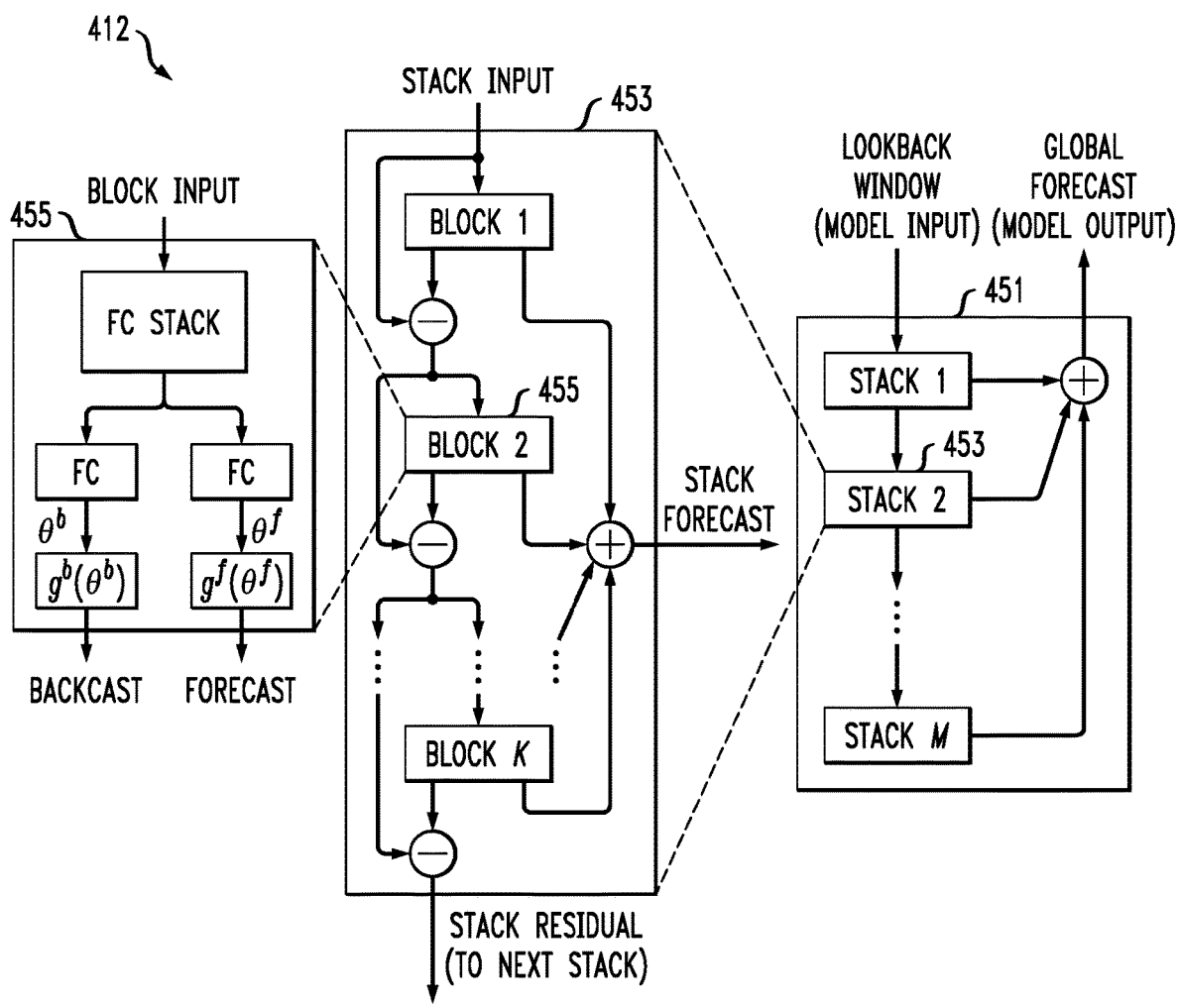
FIG. 4 shows an example forecasting model in an illustrative embodiment.

FIG. 4 shows an example forecasting model in an illustrative embodiment. By way of illustration, the example forecasting model 451 depicted in FIG. 4 is part of probabilistic supply forecasting engine 412. Specifically, as depicted in FIG. 4, in one or more embodiments, the model includes a series of stacks (e.g., Stack 1, Stack 2, . . . , Stack M), with each stack containing a set of blocks (e.g., Block 1, Block 2, . . . Block K of Stack 2 (element 453)). Each block (such as, for example, Block 2 (element 455) of Stack 2 (element 453)), includes a fully connected (FC) stack of multiple FC layers, which is used, at least in part, to connect backcast ($g^b(\theta^b)$) and forecast ($g^f(\theta^f)$) connections to one or more feedforward networks.

In at least one embodiment, a given block focuses on at least one residual mistake that the previous block(s) was/ were unable to separate. Focusing on local features of the time series, each block produces a partial forecast. The stack aggregates the partial forecasts for at least a portion of the corresponding blocks, and passes the result to the subsequent stack. In connection with looking back, an objective associated with the stacks includes discovering one or more non-local patterns along the full time axis. At the model level, the partial projections are combined into a global forecast. With respect to the stack forecast and stack residual annotations in FIG. 4, by using skip connections to determine whether an intermediate layer is useful or not, residual blocks concatenate and/or add the original input to the given layer's output. Via removal from the following block's skip connections, N-BEATS uses skip connections in a different way to make subsequent blocks' forecasting tasks easier and/or more efficient.

Also, as depicted in FIG. 4, in addition to a backcast output, each block also produces a forecast output, which, along with subsequent forecasts in the block (and/or one or more other blocks), adds up to produce a combined forecast.

In one or more embodiments, hyperparameters used in conjunction with N-BEATS can include the input and output layer sizes (e.g., constants INLEN and NFC, which can represent the sizes of the input and output layers, respectively), which should be sufficient to assign a node to each source data feature. Additionally, in at least one embodiment, the length of input chunks must not be shorter than a given temporal period (e.g., the number of days). By way merely of example, an implementor can decide the initial length of given input chunks of data, and such a length value can be tuned based at least in part on related output(s). N-BEATS hyperparameters can also include the number of blocks within a stack, and the width of each fully connected layer in each block of a stack. Additionally, N-BEATS hyperparameters can include batch size, wherein the batch size can specify, for example, the number of observations that will be processed by the model before the matrix weights are updated. Further, N-BEATS hyperparameters can also include epoch information, wherein epochs instruct the model on how many training cycles the model must carry out. In one or more embodiments, during each epoch, the model performs one forward pass and one backward pass across the training dataset.

Additionally or alternatively, using quantile regression techniques, at least one embodiment includes generating one or more probabilistic forecasts. In such an embodiment, a neural network's loss function can be expressed as a quantile loss function, and quantile regression will thus not only compute a prediction value at each time step (also referred to as a point estimate), but also create uncertainty bands around the prediction value.

FIG. 5 shows example pseudocode for preparing a supply data frame in an illustrative embodiment. In this embodiment, example pseudocode 500 is executed by or under the control of at least one processing system and/or device. For example, the example pseudocode 500 may be viewed as comprising a portion of a software implementation of at least part of temporal supply-related forecasting system 105 of the FIG. 1 embodiment.

The example pseudocode 500 illustrates reading an inventory data comma-separated values (CSV) file into the supply data frame, and setting and/or selecting a given portion of the data frame.

It is to be appreciated that this particular example pseudocode shows just one example implementation of preparing a supply data frame, and alternative implementations can be used in other embodiments.

FIG. 6 shows example pseudocode for creating a time series object for a target variable and checking attributes thereof in an illustrative embodiment. In this embodiment, example pseudocode 600 is executed by or under the control of at least one processing system and/or device. For example, the example pseudocode 600 may be viewed as comprising a portion of a software implementation of at least part of temporal supply-related forecasting system 105 of the FIG. 1 embodiment.

The example pseudocode 600 illustrates creating a univariate target time series ts_P from a supply column (e.g., supply day 1 column) of a given dataset and a group of feature columns of the given dataset in a multivariate time series of covariates. As used herein in this context, "feature" and "attribute" are used synonymously. In one or more embodiments, a gradient descent of neural networks can be misled if the dataset contains values of different magnitudes. Accordingly, such an embodiment can include, for example, instantiating a Darts' scaler class and fitting the class to the training set of the price time series before applying the scaler to both the training dataset and the testing dataset.

Also, example pseudocode 600 illustrates checking attributes of the univariate target time series ts_P, wherein such attributes can include, for example, components, duration, frequency, index-related information, status information (e.g., identifying whether ts_P is deterministic, and identifying whether ts_P is univariate), etc.

It is to be appreciated that this particular example pseudocode shows just one example implementation of creating a time series object for a target variable and checking attributes thereof, and alternative implementations can be used in other embodiments.

FIG. 7 shows example pseudocode for configuring an N-BEATS model in an illustrative embodiment. In this embodiment, example pseudocode 700 is executed by or under the control of at least one processing system and/or device. For example, the example pseudocode 700 may be viewed as comprising a portion of a software implementation of at least part of temporal supply-related forecasting system 105 of the FIG. 1 embodiment.

The example pseudocode 700 illustrates configuring an N-BEATS model with parameters including input chunk length, output chunk length, number of stacks, layer widths, batch size, number of epochs, epoch value period, likelihood, optimizer, model name, measurement and visualization tool, architecture, etc.

One or more embodiments can also include adding an additional 48 hours to the time steps to determine actual observations. In such an embodiment, the time series can be prepared for an out-of-sample forecast beyond the end of the actual observations, which can include merging the feature covariates and the date-time covariates in a multivariate time series object to ensure that the components extend over the same stretch of the time axis. The likelihood parameter of the N-BEATS model, which can include quantile regression techniques (QUANTILES) as depicted in example pseudocode 700, advises the N-BEATS model to draw one or more samples from a quantile loss function at each time step. This will generate a probabilistic forecast of quantiles instead of a mere point estimate.

It is to be appreciated that this particular example pseudocode shows just one example implementation of configuring an N-BEATS model, and alternative implementations can be used in other embodiments.

In at least one embodiment, the length of a testing dataset can correspond to the forecast horizon for the prediction and/or one or more time series of covariates and time-based data and/or time-based characteristics, in addition to one or more other features. Such an embodiment can also include obtaining and/or determining quantiles through quantile regression, wherein each quantile prediction reflects its own univariate time series. These quantile values can, for example, be transformed in reverse to be consistent with an original supply number. Further, one or more embodiments can include assigning the 50% quantile (i.e., the median or center forecast series) to a specific variable. The accuracy metrics are then derived by comparing the median forecast to the actual series.

At least one embodiment also includes predicting, for example, the hourly demand for at least one given item for the twelve hours after the testing dataset. To generate an out-of-sample prediction, such an embodiment includes using one or more variables (also referred to herein as parameters) that span the extended forecast horizon. Such variables can include, for example, the (configurable) output chunk length set to 12, wherein the out-of-sample forecast could have covered the 12 hours (configurable) without requiring provision of future covariates as inputs. In such an example embodiment, because the model trained an output chunk length of 12, the model can predict one or more additional sets of hours without going through another training exercise.

Additionally, one or more embodiments can include using deep learning techniques to generate forecasts in connection with analyzed time series influenced by one or more external variables. For example, such an embodiment can include utilizing deep learning techniques to generate forecasts in connection with heterogeneous univariate time series forecasting problems using no time series domain knowledge. Such an embodiment can further include additionally constraining such deep learning techniques (e.g., a deep learning model) to force the deep learning techniques to decompose a forecast into multiple distinct human-interpretable outputs (e.g., outputs generated in one or more human-readable formats). Such deep learning techniques (e.g., a deep learning model) can be trained on multiple time series in a multi-task fashion, successfully transferring and sharing individual learnings.

Accordingly, as detailed herein, at least one embodiment includes using one or more proactive time series prediction models to facilitate continuity with one or more supply parameters and consistency with commitment data.

It is to be appreciated that some embodiments described herein utilize one or more artificial intelligence models. It is to be appreciated that the term "model," as used herein, is intended to be broadly construed and may comprise, for example, a set of executable instructions for generating computer-implemented recommendations and/or predictions. For example, one or more of the models described herein may be trained to generate recommendations based on historical and present asset-related data collected from various devices (e.g., user devices 102), and such recommendations can be used to initiate one or more automated actions (e.g., automated temporally related asset workflow execution tasks).

FIG. 8 is a flow diagram of a process for temporal supply-related forecasting using artificial intelligence techniques in an illustrative embodiment. It is to be understood that this particular process is only an example, and additional or alternative processes can be carried out in other embodiments.

In this embodiment, the process includes steps 800 through 804. These steps are assumed to be performed by the temporal supply-related forecasting system 105 utilizing elements 112, 114 and 116.

Step 800 includes determining one or more forecasts pertaining to supply of at least one item by processing supply-related data using one or more artificial intelligence techniques. In at least one embodiment, processing supply-related data using one or more intelligence techniques can include processing historical values pertaining to supply of the at least one item over one or more temporal periods.

Additionally or alternatively, in one or more embodiments, processing supply-related data includes processing supply-related data using at least one N-BEATS forecasting technique. In such an embodiment, processing supply-related data using at least one N-BEATS forecasting technique includes implementing a univariate time series prediction architecture comprising a deep neural network structure based at least in part on forward and backward residual connections and a deep fully connected layer stack. Additionally or alternatively, processing supply-related data using at least one N-BEATS forecasting technique includes configuring one or more hyperparameters of the at least one N-BEATS forecasting technique, wherein the one or more hyperparameters include input layer size, output layer size, number of blocks within each of one or more stacks, width of each of one or more fully connected layers in each block of each of one or more stacks, batch size, and/or epoch information. Also, in such an embodiment, processing supply-related data using at least one N-BEATS forecasting technique can further include using one or more quantile regression techniques.

Step 802 includes generating, based at least in part on the one or more forecasts, one or more temporal recommendations associated with one or more orders of at least one a portion of the at least one item. In one or more embodiments, generating one or more temporal recommendations includes processing, using one or more rule-based techniques, at least a portion of the one or more forecasts in conjunction with information pertaining to at least a portion of the one or more orders.

Step 804 includes performing one or more automated actions based at least in part on the one or more temporal recommendations. In at least one embodiment, performing one or more automated actions includes automatically initiating an increase in the supply of at least one a portion of the at least one item based at least in part on the one or more temporal recommendations. Additionally or alternatively, performing one or more automated actions can include automatically outputting one or more commitment values, based at least in part on the one or more temporal recommendations, to at least one user in response to at least a portion of the one or more orders. Also, in one or more embodiments, performing one or more automated actions can include automatically training at least a portion of the one or more artificial intelligence techniques using feedback related to at least a portion of the one or more temporal recommendations.

Accordingly, the particular processing operations and other functionality described in conjunction with the flow diagram of FIG. 8 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to generate and implement temporal supply-related forecasts using artificial intelligence techniques. These and other embodiments can effectively overcome problems associated with unnecessary delays and/or inconsistencies in delivery dates.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
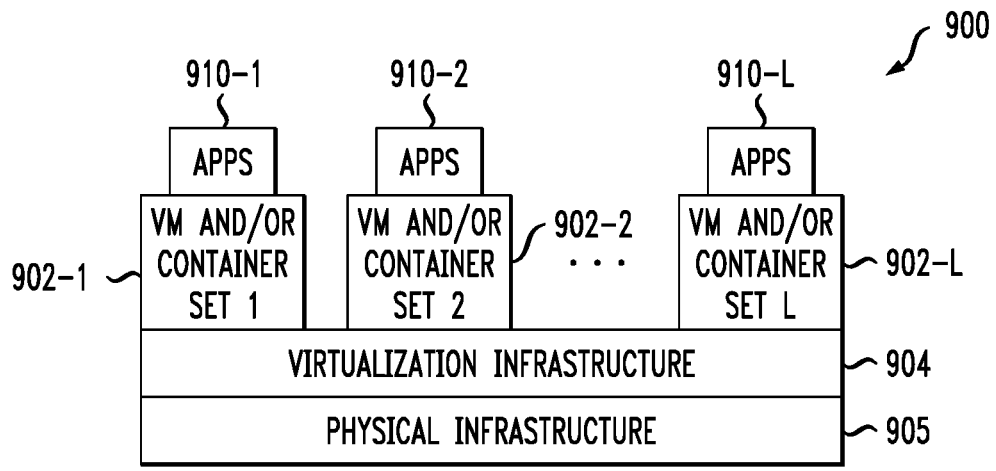
FIGS. 9 and 10 show examples of processing platforms that may be utilized to implement at least a portion of an information processing system in illustrative embodiments.
Figure 10:
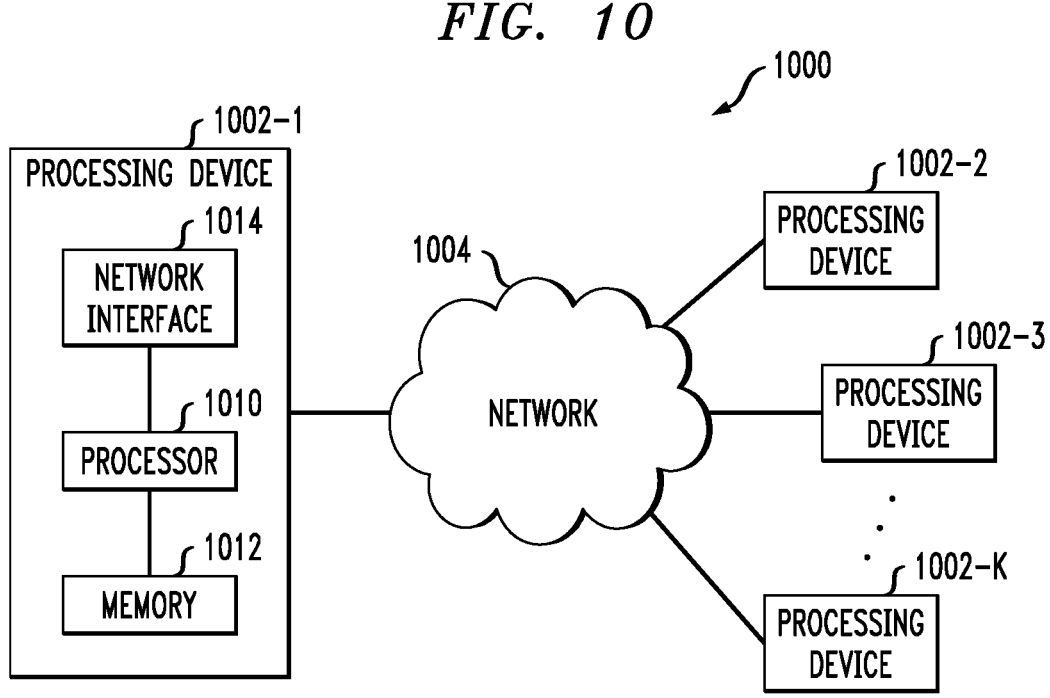

FIG. 9 shows an example processing platform comprising cloud infrastructure 900. The cloud infrastructure 900 comprises a combination of physical and virtual processing resources that are utilized to implement at least a portion of the information processing system 100. The cloud infrastructure 900 comprises multiple virtual machines (VMs) and/or container sets 902-1, 902-2, . . . , 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 comprise respective VMs, respective sets of one or more containers, or respective sets of one or more containers running in VMs. In some implementations of the FIG. 9 embodiment, the VMs/container sets 902 comprise respective VMs implemented using virtualization infrastructure 904 that comprises at least one hypervisor.

A hypervisor platform may be used to implement a hypervisor within the virtualization infrastructure 904, wherein the hypervisor platform has an associated virtual infrastructure management system. The underlying physical machines comprise one or more information processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1002-1 in the processing platform 1000 comprises a processor 1010 coupled to a memory 1012.

The processor 1010 comprises a microprocessor, a CPU, a GPU, a TPU, a microcontroller, an ASIC, a FPGA or other type of processing circuitry, as well as portions or combinations of such circuitry elements.

The memory 1012 comprises random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   processing supply-related data associated with at least one item by merging, using one or more artificial intelligence techniques, (i) one or more feature covariates related to the at least one item and (ii) one or more temporal-based covariates into at least one multivariate time series object;
   determining one or more probabilistic forecasts pertaining to supply of the at least one item by computing, via processing at least a portion of the at least one multivariate time series object using at least one neural network comprising a quantile loss function, a respective prediction value at each of multiple time steps related to the supply of the at least one item;
   generating, based at least in part on the one or more probabilistic forecasts, one or more temporal recommendations associated with one or more orders of at least a portion of the at least one item; and
   performing one or more automated actions based at least in part on the one or more temporal recommendations, wherein performing one or more automated actions comprises automatically initiating, by transmitting a set of executable instructions to at least one system associated with one or more automated temporally related asset workflow execution tasks, an increase in a supply of the at least a portion of the at least one item at one or more designated instances of time based at least in part on the one or more temporal recommendations;
   wherein the method is performed by at least one processing device comprising a processor coupled to a memory.

2. The computer-implemented method of claim 1, wherein processing supply-related data comprises processing supply-related data using at least one neural basis expansion analysis for interpretable time series forecasting technique.

3. The computer-implemented method of claim 2, wherein processing supply-related data using at least one neural basis expansion analysis for interpretable time series forecasting technique comprises implementing a univariate time series prediction architecture comprising a deep neural network structure based at least in part on forward and backward residual connections and a deep fully connected layer stack.

4. The computer-implemented method of claim 2, wherein processing supply-related data using at least one neural basis expansion analysis for interpretable time series forecasting technique comprises configuring one or more hyperparameters of the at least one neural basis expansion analysis for interpretable time series forecasting technique, wherein the one or more hyperparameters comprise at least one of input layer size, output layer size, number of blocks within each of one or more stacks, width of each of one or more fully connected layers in each block of each of one or more stacks, batch size, and epoch information.

5. The computer-implemented method of claim 2, wherein processing supply-related data using at least one neural basis expansion analysis for interpretable time series forecasting technique further comprises using one or more quantile regression techniques.

6. The computer-implemented method of claim 1, wherein performing one or more automated actions comprises automatically outputting one or more commitment values, based at least in part on the one or more temporal recommendations, to at least one user in response to at least a portion of the one or more orders.

7. The computer-implemented method of claim 1, wherein performing one or more automated actions comprises automatically training at least a portion of the one or more artificial intelligence techniques using feedback related to at least a portion of the one or more temporal recommendations.

8. The computer-implemented method of claim 1, wherein processing supply-related data using one or more intelligence techniques comprises processing historical values pertaining to supply of the at least one item over one or more temporal periods.

9. The computer-implemented method of claim 1, wherein generating one or more temporal recommendations comprises processing, using one or more rule-based techniques, at least a portion of the one or more probabilistic forecasts in conjunction with information pertaining to at least a portion of the one or more orders.

10. A non-transitory processor-readable storage medium having stored therein program code of one or more software programs, wherein the program code when executed by at least one processing device causes the at least one processing device:
to process supply-related data associated with at least one item by merging, using one or more artificial intelligence techniques, (i) one or more feature covariates related to the at least one item and (ii) one or more temporal-based covariates into at least one multivariate time series object;
to determine one or more probabilistic forecasts pertaining to supply of the at least one item by computing, via processing at least a portion of the at least one multivariate time series object using at least one neural network comprising a quantile loss function, a respective prediction value at each of multiple time steps related to the supply of the at least one item;
to generate, based at least in part on the one or more probabilistic forecasts, one or more temporal recommendations associated with one or more orders of at least a portion of the at least one item; and
to perform one or more automated actions based at least in part on the one or more temporal recommendations, wherein performing one or more automated actions comprises automatically initiating, by transmitting a set of executable instructions to at least one system associated with one or more automated temporally related asset workflow execution tasks, an increase in a supply of the at least a portion of the at least one item at one or more designated instances of time based at least in part on the one or more temporal recommendations.

11. The non-transitory processor-readable storage medium of claim 10, wherein processing supply-related data comprises processing supply-related data using at least one neural basis expansion analysis for interpretable time series forecasting technique.

12. The non-transitory processor-readable storage medium of claim 11, wherein processing supply-related data using at least one neural basis expansion analysis for interpretable time series forecasting technique comprises implementing a univariate time series prediction architecture comprising a deep neural network structure based at least in part on forward and backward residual connections and a deep fully connected layer stack.

13. The non-transitory processor-readable storage medium of claim 10, wherein performing one or more automated actions comprises automatically outputting one or more commitment values, based at least in part on the one or more temporal recommendations, to at least one user in response to at least a portion of the one or more orders.

14. An apparatus comprising:
at least one processing device comprising a processor coupled to a memory;
the at least one processing device being configured:
to process supply-related data associated with at least one item by merging, using one or more artificial intelligence techniques, (i) one or more feature covariates related to the at least one item and (ii) one or more temporal-based covariates into at least one multivariate time series object;
to determine one or more probabilistic forecasts pertaining to supply of the at least one item by computing, via processing at least a portion of the at least one multivariate time series object using at least one neural network comprising a quantile loss function, a respective prediction value at each of multiple time steps related to the supply of the at least one item;
to generate, based at least in part on the one or more probabilistic forecasts, one or more temporal recommendations associated with one or more orders of at least a portion of the at least one item; and
to perform one or more automated actions based at least in part on the one or more temporal recommendations, wherein performing one or more automated actions comprises automatically initiating, by transmitting a set of executable instructions to at least one system associated with one or more automated temporally related asset workflow execution tasks, an increase in a supply of the at least a portion of the at least one item at one or more designated instances of time based at least in part on the one or more temporal recommendations.

15. The apparatus of claim 14, wherein processing supply-related data comprises processing supply-related data using at least one neural basis expansion analysis for interpretable time series forecasting technique.

16. The apparatus of claim 15, wherein processing supply-related data using at least one neural basis expansion analysis for interpretable time series forecasting technique comprises implementing a univariate time series prediction architecture comprising a deep neural network structure based at least in part on forward and backward residual connections and a deep fully connected layer stack.

17. The apparatus of claim 14, wherein performing one or more automated actions comprises automatically outputting one or more commitment values, based at least in part on the one or more temporal recommendations, to at least one user in response to at least a portion of the one or more orders.

18. The apparatus of claim 14, wherein performing one or more automated actions comprises automatically training at least a portion of the one or more artificial intelligence techniques using feedback related to at least a portion of the one or more temporal recommendations.

19. The apparatus of claim 14, wherein processing supply-related data using one or more intelligence techniques comprises processing historical values pertaining to supply of the at least one item over one or more temporal periods.

20. The apparatus of claim 14, wherein generating one or more temporal recommendations comprises processing, using one or more rule-based techniques, at least a portion of the one or more probabilistic forecasts in conjunction with information pertaining to at least a portion of the one or more orders.

* * * * *